United States Patent
Ono et al.

(10) Patent No.: US 11,024,856 B2
(45) Date of Patent: Jun. 1, 2021

(54) ELECTROCHEMICAL REACTION SINGLE CELL HAVING CATHODE INCLUDING CERIUM OXIDE AND STRONTIUM SULFATE AND ELECTROCHEMICAL REACTION CELL STACK INCLUDING THE SAME

(71) Applicant: MORIMURA SOFC TECHNOLOGY CO., LTD., Komaki (JP)

(72) Inventors: Tatsuya Ono, Komaki (JP); Shiro Inoue, Konan (JP)

(73) Assignee: MORIMURA SOFC TECHNOLOGY CO., LTD., Komaki (JP)

( * ) Notice: Subject to any disclaimer, the term of this patent is extended or adjusted under 35 U.S.C. 154(b) by 105 days.

(21) Appl. No.: 16/321,863

(22) PCT Filed: Jul. 24, 2017

(86) PCT No.: PCT/JP2017/026636
§ 371 (c)(1),
(2) Date: Jan. 30, 2019

(87) PCT Pub. No.: WO2018/030132
PCT Pub. Date: Feb. 15, 2018

(65) Prior Publication Data
US 2019/0165378 A1 May 30, 2019

(30) Foreign Application Priority Data
Aug. 8, 2016 (JP) .............................. JP2016-155277

(51) Int. Cl.
*H01M 4/88* (2006.01)
*H01M 8/12* (2016.01)
(Continued)

(52) U.S. Cl.
CPC ............. *H01M 4/881* (2013.01); *H01M 4/86* (2013.01); *H01M 4/8657* (2013.01); *H01M 8/02* (2013.01);
(Continued)

(58) Field of Classification Search
CPC ...... H01M 4/881; H01M 4/86; H01M 4/8657; H01M 8/02; H01M 8/0236; H01M 8/0269; H01M 8/12
(Continued)

(56) References Cited

U.S. PATENT DOCUMENTS

2004/0051741 A1   3/2004  Venturino
2005/0255355 A1   11/2005 Ukai et al.
(Continued)

FOREIGN PATENT DOCUMENTS

CN     1269613 A    * 10/2000
CN     103378364 A  * 10/2013
(Continued)

OTHER PUBLICATIONS

Fangfang Wang et al., "Effect of strontium concentration on sulfur poisoning of LSCF cathodes", Inspec, The Institution of Electrical Engineers, Solid State Ionics, vol. 225, Elsevier, XP002733633, Stevenage, GB, Oct. 4, 2012, pp. 157-160.
(Continued)

*Primary Examiner* — Sean P Cullen
(74) *Attorney, Agent, or Firm* — Sughrue Mion, PLLC

(57) ABSTRACT

An electrochemical reaction unit cell including an electrolyte layer containing a solid oxide; a cathode and an anode which face each other in a first direction with the electrolyte layer intervening therebetween; and an intermediate layer disposed between the electrolyte layer and the cathode and containing a first cerium oxide. In the electrochemical reaction unit cell, the cathode includes an active layer
(Continued)

containing a strontium-containing perovskite oxide, a second cerium oxide, sulfur, and strontium sulfate and having ion conductivity and electron conductivity, and a grain of the strontium sulfate covers at least a portion of the surface of a grain of the second cerium oxide.

5 Claims, 6 Drawing Sheets

(51) Int. Cl.
*H01M 8/02* (2016.01)
*H01M 4/86* (2006.01)
*H01M 8/0236* (2016.01)
*H01M 8/0202* (2016.01)
*C25B 9/00* (2021.01)
*H01M 8/124* (2016.01)

(52) U.S. Cl.
CPC ....... *H01M 8/0236* (2013.01); *H01M 8/0269* (2013.01); *H01M 8/12* (2013.01); *C25B 9/00* (2013.01); *H01M 2008/1293* (2013.01)

(58) Field of Classification Search
USPC .......................................... 429/482, 489, 496
See application file for complete search history.

(56) References Cited

U.S. PATENT DOCUMENTS

| 2007/0148521 | A1 | 6/2007 | Ukai et al. |
| 2012/0270139 | A1 | 10/2012 | Park et al. |
| 2013/0078551 | A1 | 3/2013 | Kim et al. |
| 2014/0057192 | A1 | 2/2014 | Ohno et al. |
| 2014/0162149 | A1* | 6/2014 | Niimi .................. H01M 4/8621 429/405 |
| 2014/0315116 | A1* | 10/2014 | Ohmori .................. C04B 35/26 429/482 |
| 2015/0024302 | A1 | 1/2015 | Kobayashi et al. |
| 2018/0131007 | A1* | 5/2018 | Fujisaki .............. H01M 4/9033 |

FOREIGN PATENT DOCUMENTS

| DE | 11 2014 004 447 T5 | 6/2016 |
| EP | 2 830 137 A2 | 1/2015 |
| JP | 2004-135271 A | 4/2004 |
| JP | 2005-322547 A | 11/2005 |
| JP | 2012-227011 A | 11/2012 |
| JP | 2014-135271 A | 7/2014 |
| JP | 5596875 B1 | 9/2014 |
| JP | 2015-38858 A | 2/2015 |
| JP | 2015-88442 A | 5/2015 |
| JP | 2016-51502 A | 4/2016 |

OTHER PUBLICATIONS

Fangfang Wang et al., "Sulfur Poisoning on $La_{0.6}Sr_{0.4}Co_{0.2}FeO_{.8}O_3$ Cathode for SOFCs", Journal of the Electrochemical Society, vol. 158, No. 11, ECS, XP055157712, Oct. 5, 2011, pp. B1391-B1397.
Communication dated Jan. 2, 2020, issued by the European Patent Office in counterpart European Application No. 17839205.6.
International Search Report dated Sep. 5, 2017 by the International Searching Authority in counterpart International patent Application No. PCT/JP2017/026636. (PCT/ISA/210).
Office Action dated Aug. 7, 2018 by the Japanese Patent Office in counterpart Japanese Patent Application No. 2017-558586.

* cited by examiner

| SAMPLE No. | CONFIGURATION OF ACTIVE LAYER OF CATHODE | SrSO$_4$ LENGTH | GDC OCCUPANCY | POWER GEN. DETERIORATION RATIO | INITIAL VOLTAGE | RATING |
|---|---|---|---|---|---|---|
| 1 | LSCF+(GDC+S) | LSCF<<GDC | >36 | <0.87% | 0.9V< | B |
| 2 | LSCF+(GDC+S) | LSCF<<GDC | 36 | <0.87% | 0.9V≧ | A |
| 3 | LSCF+(GDC+S) | LSCF<<GDC | 13.8 | 0.87% | ↑ | A |
| 4 | LSCF+(GDC2) | LSCF<<GDC | 2.8 | 0.87~1.02% | ↑ | A |
| 5 | LSCF+(GDC+S) | LSCF<<GDC | 1.4 | 0.87~1.02% | ↑ | A |
| 6 | LSCF+(GDC+S) | LSCF>GDC | <1.4 | 1.02% | ↑ | B |
| 7 | LSCF+GDC | LSCF>GDC | 13.8 | 1.05% | ↑ | C |
| 8 | LSCF+GDC | LSCF>GDC | 2.8 | >1.05% | ↑ | C |

ELECTROCHEMICAL REACTION SINGLE CELL HAVING CATHODE INCLUDING CERIUM OXIDE AND STRONTIUM SULFATE AND ELECTROCHEMICAL REACTION CELL STACK INCLUDING THE SAME

CROSS REFERENCE TO RELATED APPLICATIONS

This application is a National Stage of International Application No. PCT/JP2017/026636, filed Jul. 24, 2017, claiming priority based on Japanese Patent Application No. 2016-136284, filed Aug. 8, 2016.

TECHNICAL FIELD

A technique disclosed in the present specification relates to an electrochemical reaction unit cell.

BACKGROUND ART

A known type of a fuel cell for generating electricity by utilizing electrochemical reaction between hydrogen and oxygen is a solid oxide fuel cell (hereinafter may be referred to as "SOFC"). A unit cell of a fuel cell (hereinafter may be referred to as a "unit cell"), which is a constitutive unit of SOFC, includes an electrolyte layer containing a solid oxide, a cathode, and an anode such that the cathode and the anode face each other in a predetermined direction (hereinafter referred to as a "direction of array") and the electrolyte layer intervenes between these electrodes.

In the unit cell, Sr (strontium) contained in the cathode may react with an element contained in the electrolyte layer (e.g., Zr (zirconium)) to form a layer of high resistance (e.g., $SrZrO_3$ layer), resulting in a deterioration in power generation performance. In a known technique for preventing such a problem, an intermediate layer is disposed between the cathode and the electrolyte layer (see, for example, Patent Document 1). The intermediate layer prevents diffusion of Sr (i.e., a cause of formation of a layer of high resistance) from the cathode to the electrolyte layer, thereby preventing formation of the layer of high resistance. In order to secure the ion conductivity of the intermediate layer, the intermediate layer is formed so as to contain a Ce oxide (e.g., GDC (gadolinium-doped ceria)).

PRIOR ART DOCUMENT

Patent Document

Patent Document 1: Japanese Patent Application Laid-Open (kokai) No. 2012-227011

SUMMARY OF THE INVENTION

Problem to be Solved by the Invention

In the unit cell including the intermediate layer, Sr may diffuse from the cathode into the intermediate layer, an element contained in the electrolyte layer may diffuse into the intermediate layer, and Sr may react with the element diffused from the electrolyte layer in the intermediate layer to form a layer of high resistance, resulting in a deterioration in power generation performance. Thus, a further improvement is required in the unit cell including the intermediate layer for preventing a deterioration in power generation performance.

Such a problem is common with a solid oxide electrolysis cell (hereinafter may be referred to as "SOEC") for generating hydrogen by utilizing the electrolysis of water. In the present specification, a fuel cell unit cell and an electrolysis cell are collectively referred to as an "electrochemical reaction unit cell."

The present specification discloses a technique capable of solving the aforementioned problems.

Means for Solving the Problem

A technique disclosed in the present specification can be implemented in the following modes.

(1) An electrochemical reaction unit cell disclosed in the present specification comprises an electrolyte layer containing a solid oxide; a cathode and an anode which face each other in a first direction with the electrolyte layer intervening therebetween; and an intermediate layer disposed between the electrolyte layer and the cathode and containing a first cerium oxide. In the electrochemical reaction unit cell, the cathode includes an active layer containing a strontium-containing perovskite oxide, a second cerium oxide, and strontium sulfate and having ion conductivity and electron conductivity. According to the present electrochemical reaction unit cell, since strontium (Sr) reacts with sulfur (S) and oxygen to form strontium sulfate ($SrSO_4$) in the active layer of the cathode, diffusion of strontium from the cathode to the electrolyte layer can be prevented, thereby preventing formation of a layer of high resistance from Sr and an element contained in the electrolyte layer. Since strontium sulfate is an insulating substance, if each grain of the strontium sulfate covers a large region of the surface of a grain of the perovskite oxide (i.e., an oxygen ionization reaction site) contained in the cathode, the area of the oxygen ionization reaction site is reduced in the cathode. This may cause an increase in the activation polarization (i.e., polarization resistance) of the cathode. However, according to the present electrochemical reaction unit cell, the active layer of the cathode contains both the perovskite oxide and the second cerium oxide, and a grain of the strontium sulfate covers the surface of a grain of the second cerium oxide, thereby reducing the area of coverage of the surface of a grain of the perovskite oxide with the grain of the strontium sulfate. Thus, an increase in the activation polarization of the cathode can be prevented, as compared with the case where a grain of the strontium sulfate covers a grain of the perovskite oxide. Therefore, the present electrochemical reaction unit cell can prevent a deterioration in performance.

(2) In the above-described electrochemical reaction unit cell, a grain of the strontium sulfate contained in the cathode may cover at least a portion of the surface of a grain of the second cerium oxide.

(3) In the above-described electrochemical reaction unit cell, the cathode may further contain sulfur.

(4) in the above-described electrochemical reaction unit cell, in at least one cross section of the active layer of the cathode, a grain of the strontium sulfate may cover at least a portion of the surface of a grain of the second cerium oxide, and the boundary between the grain of the strontium sulfate and a grain of the perovskite oxide may be shorter than the boundary between the grain of the strontium sulfate and the grain of the second cerium oxide. According to the present electrochemical reaction unit cell, a grain of the strontium sulfate covers a smaller region of the surface of a grain of the perovskite oxide, as compared with the case where the boundary between the grain of the strontium sulfate and the grain of the perovskite oxide is longer than the boundary between the grain of the strontium sulfate and the grain of the second cerium oxide. Thus, an increase in the activation polarization of the cathode can be prevented. It is not necessarily the case that a grain or the strontium sulfate covers the surface of a grain of the perovskite oxide. If not, the length of the boundary between the strontium sulfate grain and the perovskite oxide grain is zero. Thus, a smaller area of coverage of the surface of the grain of the perovskite oxide with the grain of the strontium sulfate results in prevention of an increase in the activation polarization of the cathode.

(5) In the above-described electrochemical reaction unit cell, at least one cross section of the active layer of the cathode may include a region having an occupancy of the second cerium oxide of 1.4% to 36%. According to the present electrochemical reaction unit cell, a grain of the strontium sulfate covers a smaller region of the surface of a grain of the perovskite oxide, as compared with the case where the cerium oxide occupancy is less than 1.4% in any cross section of the active layer of the cathode. Thus, an increase in the activation polarization of the cathode can be more effectively prevented. Since the cerium oxide occupancy is 36% or less in any cross section of the active layer of the cathode, the oxygen ionization reaction site can be sufficiently secured, and an increase in the activation polarization can be more effectively prevented.

The technique disclosed in the present specification can be implemented in various modes; for example, a fuel cell unit cell, a fuel cell stack including a plurality of fuel cell unit cells, an electricity generation module including the fuel cell stack, a fuel cell system including the electricity generation module, an electrolysis cell unit, an electrolysis cell stack including a plurality of electrolysis cell units, a hydrogen generation module including the electrolysis cell stack, and a hydrogen generation system including the hydrogen generation module.

BRIEF DESCRIPTION OF THE DRAWINGS

FIG. 7 Explanatory table showing the results of performance evaluation of samples.

MODES FOR CARRYING OUT THE INVENTION

A. Embodiment

A-1. Structure:
(Structure of Fuel Cell Stack 100)

Figure 1:
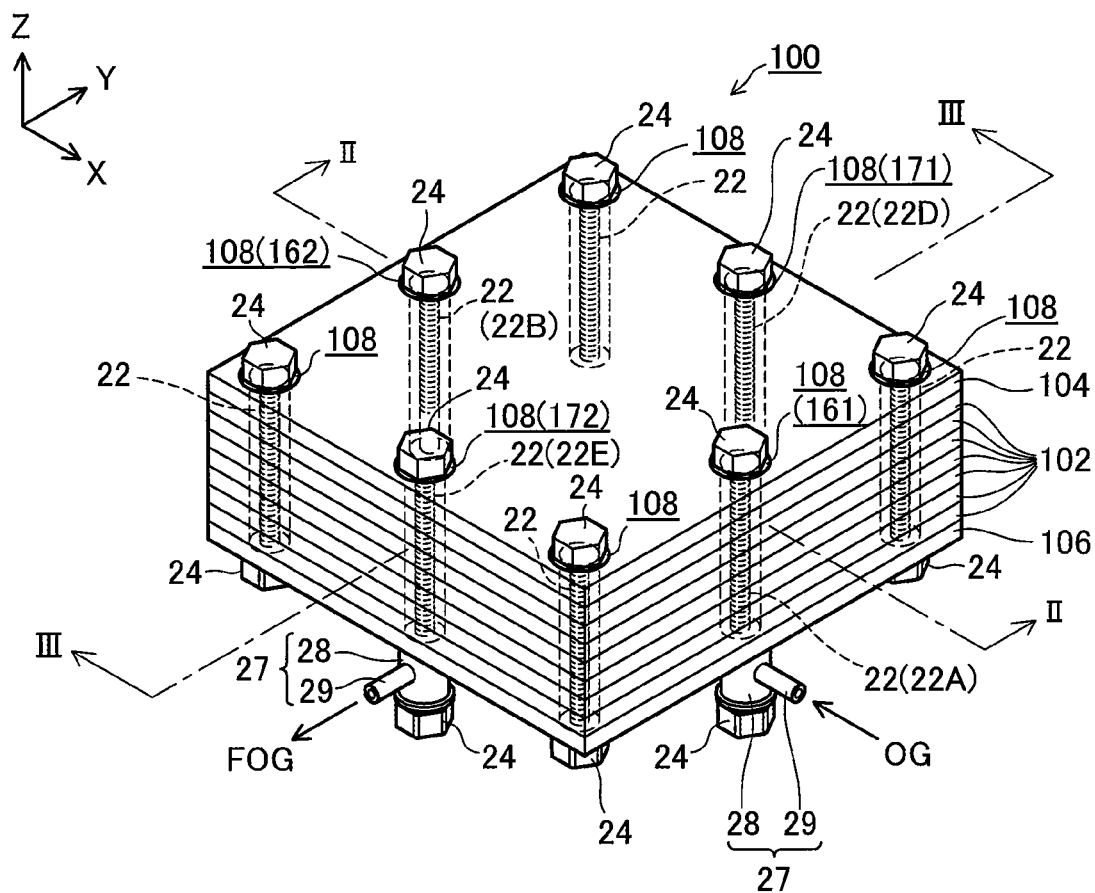
FIG. 1 Perspective view showing the external appearance of a fuel cell stack 100 according to the present embodiment.
Figure 2:
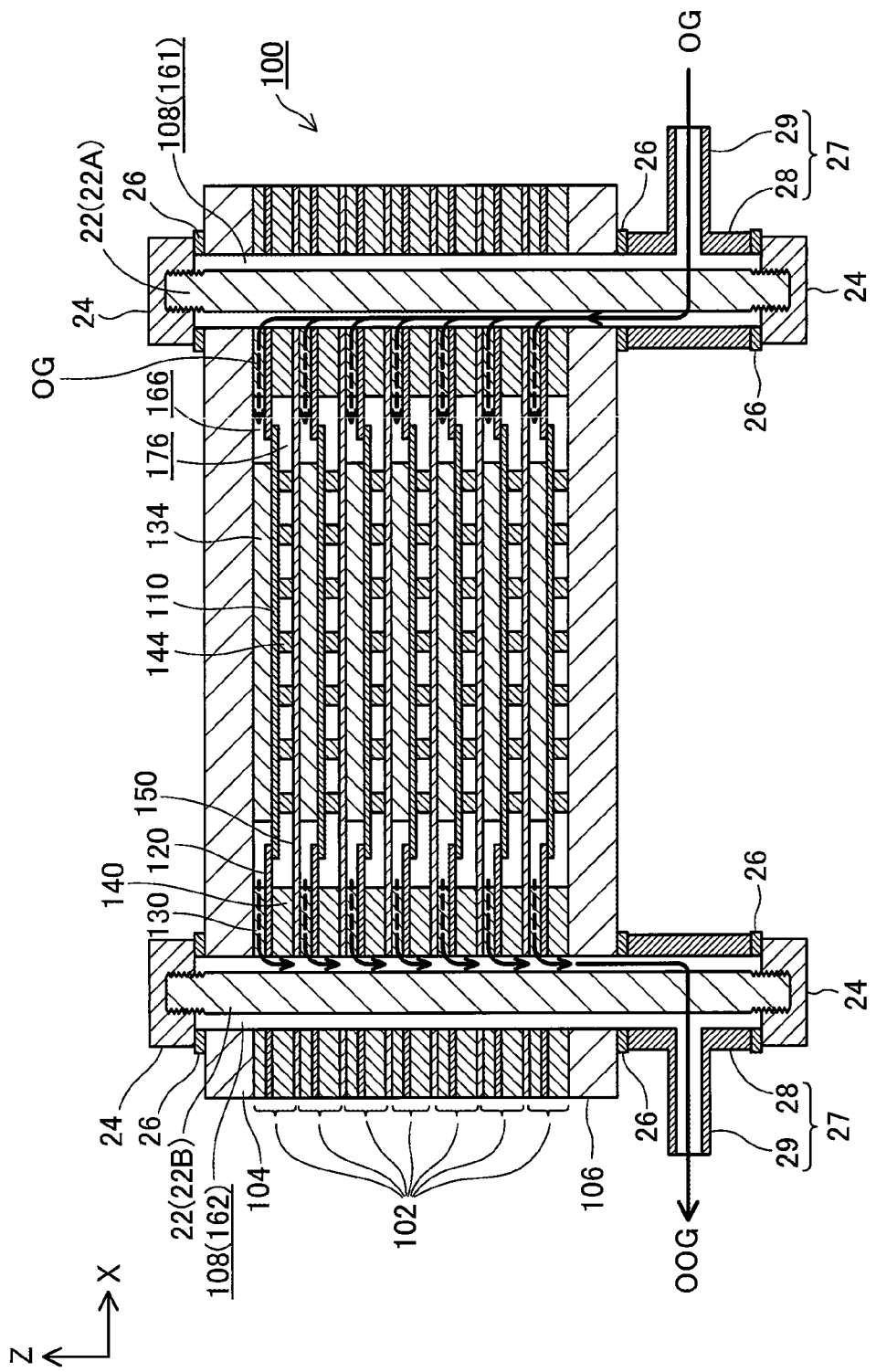
FIG. 2 Explanatory view showing an XZ section of the fuel cell stack 100 taken along line II-II of FIG. 1.
Figure 3:
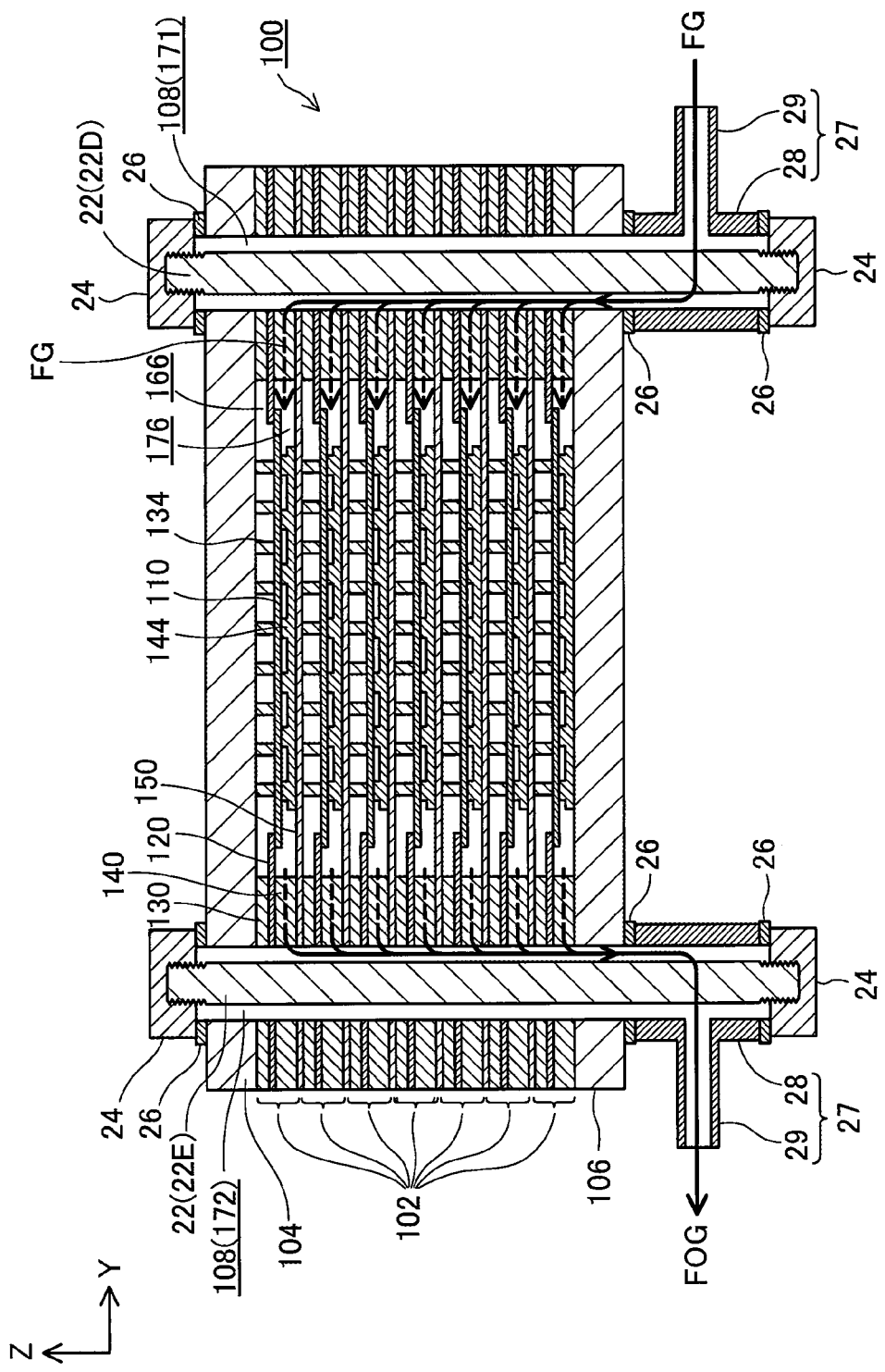
FIG. 3 Explanatory view showing a YZ section of the fuel cell stack 100 taken along line III-III of FIG. 1.

FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying respective directions. In the present specification, for the sake of convenience, the positive Z-axis direction is called the "upward direction" and the negative Z-axis direction is called the "downward direction"; however, in actuality the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined direction of array (in the vertical direction in the present embodiment). A pair of the end plates 104 and 106 is disposed in such a manner as to hold an assembly of the seven electricity generation units 102 from the upper and lower sides thereof. The direction of array (vertical direction) corresponds to the first direction appearing in CLAIMS.

The fuel cell stack 100 has a plurality (eight in the present embodiment) of holes extending in the vertical direction through peripheral portions about the Z-axis direction of its component layers (the electricity generation units 102 and the end plates 104 and 106). The corresponding holes formed in the layers communicate with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 may be referred to as the "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. As shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
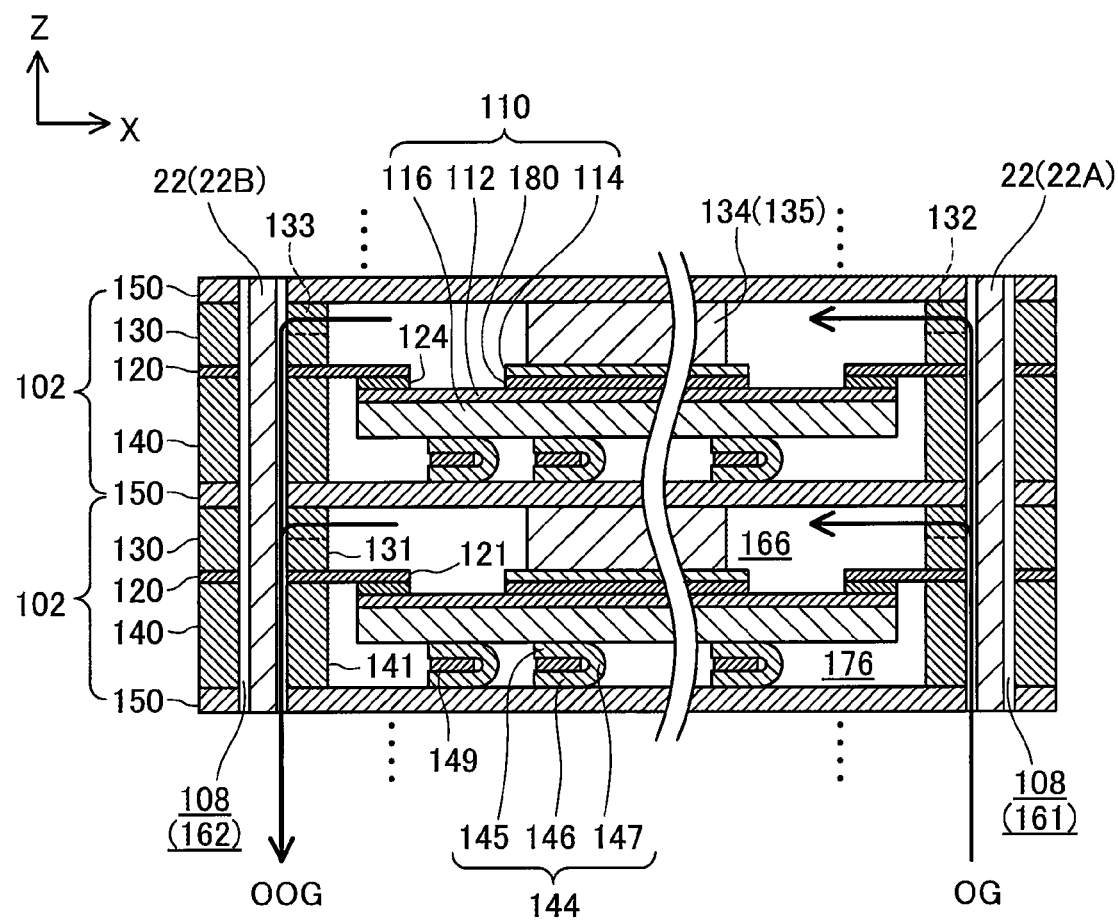
FIG. 4 Explanatory view of the same XZ section as that of FIG. 2, showing two adjacent electricity generation units 102.
Figure 5:
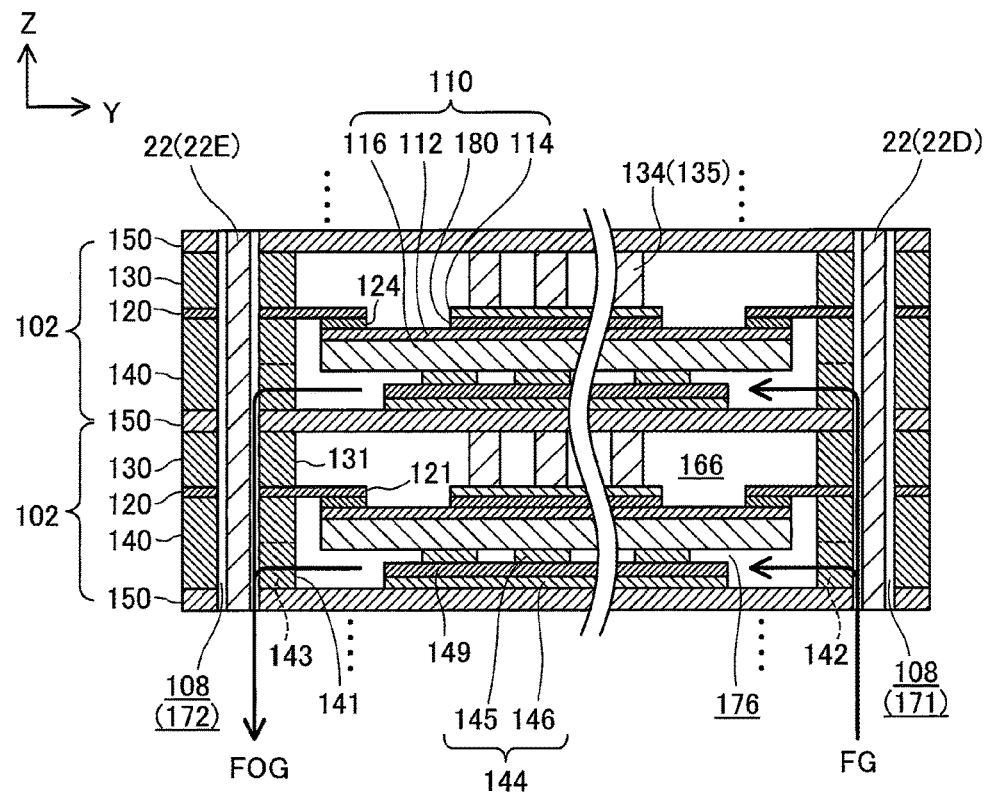
FIG. 5 Explanatory view of the same YZ section as that of FIG. 3, showing two adjacent electricity generation units 102.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102.

As shown in FIGS. 4 and 5, the electricity generation unit 102, which is the smallest unit of electricity generation, includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150. The unit cell 110 corresponds to the electrochemical reaction unit cell or the fuel cell unit cell appearing in CLAIMS.

The interconnector 150 is an electrically conductive member having an approximately rectangular flat plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, a cathode 114 and an anode 116 which face each other in the vertical direction (in the direction of array of the electricity generation units 102) with the electrolyte layer 112 intervening therebetween, and an intermediate layer 180 disposed between the electrolyte layer 112 and the cathode 114. The unit cell 110 of the present embodiment is an anode-support-type unit cell in which the anode 116 supports the electrolyte layer 112, the intermediate layer 180, and the cathode 114.

The electrolyte layer 112 is a member having an approximately rectangular flat-plate shape and is formed of a solid oxide, such as YSZ (yttria-stabilized zirconia), ScSZ (scandia-stabilized zirconia), SDC (samarium-doped ceria), or GDC (gadolinium-doped ceria). The cathode 114 is a member having an approximately rectangular flat-plate shape and is formed of, for example, an Sr (strontium)-containing perovskite oxide, such as LSCF (lanthanum strontium cobalt ferrite) or LSM (lanthanum strontium manganese oxide). The anode 116 is a member having an approximately rectangular flat-plate shape and is formed of, for example, Ni (nickel), a cermet of Ni and ceramic particles, or an Ni-based alloy. Thus, the unit cell 110 (electricity generation unit 102) according to the present embodiment is a solid oxide fuel cell (SOFC) containing a solid oxide as an electrolyte.

The intermediate layer 180 is a member having an approximately rectangular flat-plate shape and is formed of a solid oxide having ion conductivity, such as SDC, GDC, LDC (lanthanum-doped ceria), or YDC (yttrium-doped ceria). The intermediate layer 180 functions as a reaction preventing layer for preventing formation of a layer of high resistance (e.g., $SrZrO_3$ layer) through reaction between Sr contained in the cathode 114 and a transition element (e.g., Zr) contained in the electrolyte layer 112 under high-temperature conditions (e.g., during operation of the fuel cell stack 100). The intermediate layer 180, which has ion conductivity, also has a function of transferring oxide ions (generated through ionization reaction of oxygen molecules contained in the oxidizer gas OG in the cathode 114) to the electrolyte layer 112. SDC, GDC, LDC, or YDC corresponds to the first cerium oxide appearing in CLAIMS.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface of the electrolyte layer 112 on the cathode 114 side. The separator 120 is bonded to the electrolyte layer 112 (unit cell 110) by means of a bonding layer 124 formed of a brazing material (e.g., Ag brazing material) and disposed between the facing portion of the separator 120 and the electrolyte layer 112. The separator 120 separates the cathode chamber 166 which faces the cathode 114, and the anode chamber 176 which faces the anode 116, from each other, thereby preventing gas leakage from one electrode side to the other electrode side at a peripheral portion of the unit cell 110. The unit cell 110 to which the separator 120 is bonded is also called a separator-attached unit cell.

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface of the separator 120 on the side opposite the electrolyte layer 112 and with a peripheral portion of the surface of the interconnector 150 on the side toward the cathode 114. The cathode-side frame 130 electrically insulates the two interconnectors 150 included in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162.

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface of the separator 120 on the side toward the electrolyte layer 112 and with a peripheral portion of the surface of the interconnector 150 on the side toward the anode 116. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface of the anode 116 on the side opposite the electrolyte layer 112, and the interconnector facing portion 146 is in contact with the surface of the interconnector 150 on the side toward the anode 116. As described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other. A spacer 149 formed of, for example, mica is disposed between the electrode facing portion 145 and the interconnector facing portion 146. Thus, the anode-side current collector 144 follows the deformation of the electricity generation unit 102 stemming from a temperature cycle and a pressure variation of reaction gas, thereby maintaining good electrical connection between the anode 116 and the interconnector 150 (or the end plate 106) via the anode-side current collector 144.

The cathode-side current collector 134 is disposed within the cathode chamber 166. The cathode-side current collector 134 is composed of a plurality of current collector elements 135 each having an approximately rectangular columnar shape and is formed of, for example, ferritic stainless steel. The cathode-side current collector 134 is in contact with the surface of the cathode 114 on the side opposite the electrolyte layer 112 and with the surface of the interconnector 150 on the side toward the cathode 114. As described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. The cathode-side current collector 134 and the interconnector 150 may be integrally formed as a unitary member.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricity generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas FG. The electricity generating reaction is an exothermic reaction. In each electricity generation unit 102, the cathode 114 of the unit cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. In the SOFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 6:
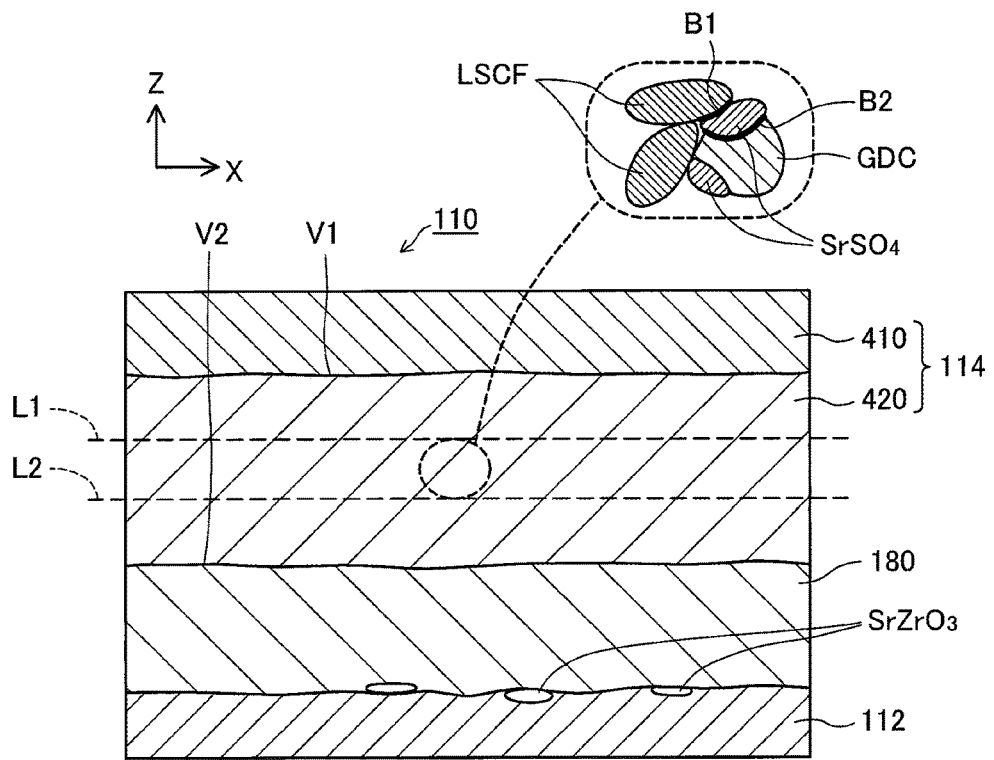
FIG. 6 Explanatory view showing an XZ section of a portion of a unit cell 110 (including a cathode 114, an intermediate layer 180, and an electrolyte layer 112).

A-3. Specific Structure of Cathode 114:

FIG. 6 is an explanatory view showing an XZ section of a portion of the unit cell 110 (including the cathode 114, the intermediate layer 180, and the electrolyte layer 112). As shown in FIG. 6, the cathode 114 includes an active layer 420 and a current collecting layer 410. The active layer 420 is disposed on the surface of the current collecting layer 410 on the side toward the electrolyte layer 112 in the Z-axis direction; i.e., the active layer 420 is located between the current collecting layer 410 and the electrolyte layer 112.

The active layer 420 of the cathode 114 mainly functions as a site of ionization reaction of oxygen contained in the oxidizer gas OG. In the present embodiment, the active layer 420 contains LSCF, GDC, S (sulfur), and $SrSO_4$ (strontium sulfate) and has ion conductivity and electron conductivity. GDC corresponds to the second cerium oxide appearing in CLAIMS.

Specifically, in the active layer 420, an $SrSO_4$ grain formed through reaction between S and Sr contained in LSCF covers at least a portion of the surface of a GDC grain at the three-phase interface between a LSCF grain, a pore (not illustrated), and the GDC grain. More specifically, in at least one cross section of the active layer 420 of the cathode 114, an $SrSO_4$ grain covers at least a portion of the surface of a GDC (second cerium oxide) grain and a portion of the surface of an LSCF (perovskite oxide) grain (i.e., the $SrSO_4$ grain is in contact with both the GDC and LSCF grains), and the boundary B1 between the $SrSO_4$ grain and the LSCF grain is shorter than the boundary B2 between the $SrSO_4$ grain and the GDC grain (see an enlarged view of FIG. 6). At least one cross section of the active layer 420 of the cathode 114 preferably includes a region where the GDC occupancy is 1.4% to 36%. The term "GDC occupancy" as used herein refers to the amount of GDC occupied in a predetermined cross-sectional region; specifically, the ratio of the total area of GDC grains to the total area of the predetermined cross-sectional region.

The current collecting layer 410 of the cathode 114 mainly functions as a site of diffusing the oxidizer gas OG supplied from the cathode chamber 166 and efficiently transferring electrons obtained through electricity generation reaction to the active layer 420. The current collecting layer 410 contains LSCF, but does not contain GDC. The active layer 420 generally contains grains having a size smaller than that of grains contained in the current collecting layer 410, and the active layer 420 is denser than the current collecting layer 410 (i.e., the active layer 420 has a lower porosity).

A-4. Production Method for Unit Cell 110:

Next will be described an example of a production method for the unit cell 110 according to the present embodiment.

(Formation of Laminate of Electrolyte Layer 112 and Anode 116)

YSZ powder (BET specific surface area: e.g., 5 to 7 $m^2/g$) is mixed with a butyral resin, dioctyl phthalate (DOP) serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for electrolyte layer having a thickness of, for example, about 10 μm. NiO powder (BET specific surface area: e.g., 3 to 4 $m^2/g$) is weighed (55 parts by mass in terms of Ni) and mixed with YSZ powder (BET specific surface area: e.g., 5 to 7 $m^2/g$) (45 parts by mass), to thereby prepare a powder mixture. The powder mixture is mixed with a butyral resin, DOP serving as a plasticizer, a dispersant, and a solvent mixture of toluene and ethanol by means of a ball mill, to thereby prepare a slurry. The resultant slurry is formed into a thin film by means of doctor blading, to thereby prepare a green sheet for anode having a thickness of, for example, 270 μm. The green sheet for electrolyte layer and the green sheet for anode are attached together and dried, followed by firing at, for example, 1,400° C., to thereby prepare a laminate of the electrolyte layer 112 and the anode 116.

(Formation of Cathode 114)

Subsequently, for example, 1 mol % sulfuric acid and sulfur compounds (0.5 mol % sodium hydrogen sulfide and 0.5 mol % ammonium hydrogen sulfide) are wet-mixed with GDC powder by use of, for example, a solvent, and the resultant mixture is calcined at 1,100° C. for three hours, to thereby prepare S-containing GDC powder. The materials for the active layer 420 of the cathode 114 (i.e., LSCF powder, the S-mixed GDC powder, and alumina powder), poly(vinyl alcohol) serving as an organic binder, and butyl carbitol serving as an organic solvent are mixed together, and the viscosity of the mixture is adjusted, to thereby prepare a paste for active layer. The paste for active layer is applied, by means of screen printing, onto the surface of the electrolyte layer 112 of the aforementioned laminate (composed of the electrolyte layer 112 and the anode 116) and then dried.

The materials for the current collecting layer 410 of the cathode 114 (i.e., LSCF powder and alumina powder), poly(vinyl alcohol) serving as an organic binder, and butyl carbitol serving as an organic solvent are mixed together, and the viscosity of the mixture is adjusted, to thereby prepare a paste for current collecting layer. The paste for current collecting layer is applied onto the paste for active layer by means of screen printing and then dried. The pastes for layers of the cathode 114 may be applied by another technique, such as spraying.

Thereafter, the resultant product is fired at, for example, 1,100° C., to thereby form the cathode 114 (including the active layer 420 and the current collecting layer 410) on the surface of the electrolyte layer 112 of the laminate (including the electrolyte layer 112 and the anode 116). As described above, in the present production method, S is mixed with the materials for the active layer 420 of the cathode 114 during preparation of the paste for active layer. Thus, Sr contained in LSCF reacts with S during the firing process, thereby generating an $SrSO_4$ grain covering at least a portion of the surface of a GDC grain. Since S is mixed with GDC powder before mixing of the GDC powder with the other materials for the active layer 420 during preparation of the paste for active layer, an $SrSO_4$ grain is more likely to be generated on a GDC grain than on an LSCF grain. The amount of generation of such an $SrSO_4$ grain covering at least a portion of the surface of a GDC grain can be adjusted by controlling the amount of S mixed with GDC powder.

The unit cell 110 having the aforementioned structure is produced through the above-described process. After the production of the unit cell 110, the aforementioned fuel cell stack 100 is produced through, for example, bonding of the cathode 114 to the cathode-side current collector 134 and an assembly process (including fastening of the fuel cell stack 100 by means of the bolts 22).

A-5. Performance Evaluation of Samples:

The fuel cell stack 100 of the present embodiment is characterized by the configuration of the active layer 420 of the cathode 114 of each unit cell 110. Next will be described the performance evaluation of a plurality of samples 1 to 8 having different configurations of the active layer 420 of the cathode 114.

For the performance evaluation of the plurality of samples 1 to 8 of the unit cell 110 having different configurations of the active layer 420 of the cathode 114, each sample was assembled into the fuel cell stack 100 having the aforementioned configuration, and the fuel cell stack 100 was subjected to determination of power generation deterioration ratio. FIG. 7 is an explanatory table showing the results of the performance evaluation of the samples.

Samples 1 to 6 are produced by use of S-mixed GDC powder as a material for the active layer 420 of the cathode 114. Samples 7 and 8 are produced by use of GDC powder not mixed with S.

(Sample 1)

As described in the aforementioned production method, 1 mol % sulfuric acid and sulfur compounds (0.5 mol % sodium hydrogen sulfide and 0.5 mol % ammonium hydrogen sulfide) (hereinafter, sulfuric acid and the sulfur compounds may be collectively referred to as a "sulfur source") are wet-mixed with GDC powder, and the resultant mixture is dried and then calcined at 1,100° C. for three hours, to thereby prepare S-containing GDC powder. The GDC powder was mixed with LSCF powder such that the ratio by weight between LSCF and GDC (LSCF:GDC) became 2:8, and a paste for active layer was prepared through the aforementioned production method. The paste for active layer was used to produce a fuel cell unit cell as sample 1.

(Sample 2)

Sample 2 differs from sample 1 only in terms of the weight ratio of LSCF to S-containing GDC. In sample 2, S-containing GDC powder is mixed with LSCF powder such that the ratio by weight between LSCF and GDC (LSCF:GDC) became 3:7. The resultant paste for active layer was used to produce a fuel cell unit cell as sample 2.

(Sample 3)

Sample 3 differs from sample 1 in terms of the preparation of S-containing GDC powder and the weight ratio of LSCF to the GDC. In sample 3, 0.7 mol % sulfuric acid and sulfur compounds (0.35 mol % sodium hydrogen sulfide and 0.35 mol % ammonium hydrogen sulfide) are wet-mixed with GDC powder, and the resultant mixture is dried and then calcined at 1,100° C. for three hours, to thereby prepare S-containing GDC powder. The GDC powder was mixed with LSCF powder such that the ratio by weight between LSCF and GDC (LSCF:GDC) became 5:5, and a paste for active layer was prepared through the aforementioned production method. The paste for active layer was used to produce a fuel cell unit cell as sample 3.

(Sample 4)

Sample 4 differs from sample 1 in terms of the preparation of S-containing GDC powder and the weight ratio of LSCF to the GDC. In sample 4, 0.4 mol % sulfuric acid and sulfur compounds (0.2 mol % sodium hydrogen sulfide and 0.2 mol % ammonium hydrogen sulfide) are wet-mixed with GDC powder, and the resultant mixture is dried and then calcined at 1,100° C. for three hours, to thereby prepare S-containing GDC powder. The GDC powder was mixed with LSCF powder such that the ratio by weight between LSCF and GDC (LSCF:GDC) became 7:3, and a paste for active layer was prepared through the aforementioned production method. The paste for active layer was used to produce a fuel cell unit cell as sample 4.

(Sample 5)

Sample 5 differs from sample 1 in terms of the preparation of S-containing GDC powder and the weight ratio of LSCF to the GDC. In sample 5, 0.1 mol % sulfuric acid and sulfur compounds (0.05 mol % sodium hydrogen sulfide and 0.05 mol % ammonium hydrogen sulfide) are wet-mixed with GDC powder, and the resultant mixture is dried and then calcined at 1,100° C. for three hours, to thereby prepare S-containing GDC powder. The GDC powder was mixed with LSCF powder such that the ratio by weight between LSCF and GDC (LSCF:GDC) became 9:1, and a paste for active layer was prepared through the aforementioned production method. The paste for active layer was used to produce a fuel cell unit cell as sample 5.

(Sample 6)

Sample 6 differs from sample 5 only in terms of the weight ratio of LSCF to S-containing GDC. In sample 6, S-containing GDC powder is mixed with LSCF powder such that the ratio by weight between LSCF and GDC (LSCF:GDC) became 9.5:0.5. The resultant paste for active layer was used to produce a fuel cell unit cell as sample 6.

(Sample 7)

Sample 7 differs from samples 1 to 6 in that the aforementioned S-containing GDC powder is not used. In sample 7, GDC powder was not wet-mixed with the aforementioned sulfur source, GDC powder was mixed with LSCF powder such that the ratio by weight between LSCF and GDC (LSCF:GDC) became 5:5, and a paste for active layer was prepared through the aforementioned production method. The paste for active layer was used to produce a fuel cell unit cell as sample 7.

(Sample 8)

In sample 8, GDC powder was not wet-mixed with the aforementioned sulfur source as in sample 7, GDC powder was mixed with LSCF powder such that the ratio by weight between LSCF and GDC (LSCF:GDC) became 7:3, and a paste for active layer was prepared through the aforementioned production method. The paste for active layer was used to produce a fuel cell unit cell as sample 8.

A fuel cell stack 100 was produced from each of the aforementioned eight samples (samples 1 to 8), and electricity generation was performed at 700° C. for 1,000 hours. Thereafter, voltage (voltage after testing) was measured during electricity generation at a current density of 0.55 A/cm². The ratio of the difference between initial voltage and voltage after testing to initial voltage was calculated by the following formula 1, and the ratio was defined as power generation deterioration ratio (%).

Power generation deterioration ratio(%)=[(initial voltage−voltage after testing)/initial voltage]× 100                                                         <Formula 1>

The term "initial voltage" as used herein refers to a voltage generated by a fuel cell stack 100 during operation at 700° C. and a current density of 0.55 A/cm² for power generation before the time of rated power generation operation reached 1,000 hours after the fuel cell stack 100 had been shipped in a power-generatable state.

As shown in FIG. 7, samples 1 to 6 (Examples) produced by use of S-containing GDC powder exhibited a relatively low power generation deterioration ratio; i.e., 1.02% or less. In contrast, samples 7 and 8 (Comparative Examples) produced by use of GDC powder exhibited a relatively high power generation deterioration ratio; i.e., 1.05% or more. The reason for this is probably as follows. As described above, a layer of high resistance (e.g., SrZrO₃ layer) is formed through reaction between Sr contained in the cathode 114 and a transition element (e.g., Zr) contained in the electrolyte layer 112 (see FIG. 6). In samples 1 to 6, Sr and S contained in the cathode 114 react with oxygen to form SrSO₄ in the active layer 420 of the cathode 114, and thus diffusion of Sr from the cathode 114 to the electrolyte layer 112 is reduced, as compared with the case of samples 7 and 8 wherein the cathode 114 does not contain S. Therefore, formation of a layer of high resistance can be prevented in samples 1 to 6.

Since SrSO₄ is an insulating substance, if a grain of SrSO₄ covers a large region of the surface of a grain of LSCF (i.e., an oxygen ionization reaction site), the area of the oxygen ionization reaction site is reduced in the cathode 114. This may cause an increase in the activation polarization of the cathode 114. However, in samples 1 to 5 shown in FIG. 7, an SrSO₄ grain covers a portion of the surface of a GDC grain in the active layer 420 of the cathode 114, and the surface region of the GDC grain covered with the SrSO₄ grain is larger than the surface region of an LSCF grain covered with the SrSO₄ grain. Thus, the SrSO₄ grain covers a smaller region of the surface of the LSCF grain, as compared with the case where an SrSO₄ grain covers only the LSCF grain. This configuration can further prevent an increase in the activation polarization of the cathode 114.

In samples 2 to 5 (rating "A"), at least one cross section of the active layer 420 of the cathode 114 includes a region where the occupancy of GDC is 1.4% to 36%. Thus, samples 2 to 5 can have initial voltage for power generation such that a relatively high voltage of 0.9 V or more is generated, and have a low power generation deterioration ratio. This is probably attributed to the fact that an occupancy of GDC of 36% or less (relative to LSCF) in the active layer 420 of the cathode 114 leads to sufficient securement of a three-phase interface at each LSCF grain required for electricity generation. An occupancy of GDC of 1.4% or more (relative to LSCF) in the active layer 420 of the cathode 114 leads to formation of SrSO₄ in the active layer 420 of the cathode 114 through reaction between oxygen and Sr and S contained in the cathode 114, and sufficient prevention of diffusion of Sr from the cathode 114 to the electrolyte layer 112. This probably contributes to prevention of formation of a layer of high resistance. Thus, samples 1 to 6 (rating "A" or "B") exhibit a power generation deterioration ratio of 1.02% or less, and are more preferred than samples 7 and 8 (rating "C"). Samples 1 to 5, which exhibit a power generation deterioration ratio of less than 1.02%, are still more preferred in view of power generation performance. Samples 2 to 5, which exhibit an initial voltage of 0.9 V or more, are still more preferred in view of compatibility between low power generation deterioration ratio and high initial voltage.

A-6. Method for Analyzing Cathode 114:

(Method for Obtaining Analytical Image)

Now will be described a method for analyzing the cathode 114 for, for example, the positional relationship between LSCF, GDC, and SrSO₄ grains. Firstly, an analytical image M1 (see FIG. 6) used for analysis of the cathode 114 is obtained by a method described below. In the unit cell 110, one cross section (including the cathode 114) in parallel with the vertical direction (z-axis direction) is appropriately determined, and an analytical image M1 (i.e., an image covering the entire region of the cathode 114 in the vertical direction) is obtained from the cross section. More specifically, a scanning electron microscope (SEM) or a similar device is used to capture an analytical image M1 such that the upper surface of the cathode 114 (i.e., the surface that is in contact with the cathode-side current collector 134) is located in the uppermost sectional region of 10 sectional regions prepared through 10-equal division of the image in the vertical direction, and such that the boundary between the cathode 114 and the electrolyte layer 112 is located in the lowermost sectional region. The analytical image M1 may be a binarized image prepared through binarization of an image captured by means of an SEM. In the case where the binarized image includes, for example, grains whose forms very differ from their actual forms, the contrast of a non-binarized image captured by means of an SEM may be adjusted, and the contrast-adjusted image may be binarized. The analytical image M1 may be a non-binarized image captured by means of an SEM. The magnification of an SEM image is adjusted such that the analytical image M1 covers the entire region of the cathode 114 in the vertical direction as described above. For example, the magnification may be adjusted to 200 to 30,000, but is not limited thereto. The magnification may be appropriately varied.

(Method for Determining Boundary V1 Between Active Layer 420 and Current Collecting Layer 410)

As described below, the boundary V1 between the current collecting layer 410 and the active layer 420 of the cathode 114 is determined by utilizing the feature that the active layer 420 has a lower porosity than the current collecting layer 410. Firstly, a plurality of virtual lines K (K1, K2, K3, . . . , Km, . . . , K(m+9), K(m+10), . . . , Kn) perpendicular to the vertical direction (Z-axis direction) are sequentially drawn on the analytical image M1 at intervals of 0.3 μm downwardly from the upper surface of the cathode 114. The lengths of portions of each virtual line K overlapping with pores are measured, and the lengths are totaled. The ratio of the total of the lengths of portions of the virtual line K overlapping with pores to the entire length of the virtual line K is defined as the percentage of pores present on the virtual line K (porosity Ks of the virtual line K). Subsequently, there are determined data groups each consisting of the porosities Ks of 10 downwardly consecutive virtual lines K selected from among all the porosities Ks of virtual lines K (i.e., Ks1, Ks2, Ks3, . . . , Ksm, . . . , Ks(m+9), Ks(m+10), . . . , Ksn). In each data group, the average (Ave) of the 10 porosities Ks and the standard deviation (σ) of the porosities Ks are calculated.

In the downward order, data group G1 consists of Ks1, Ks2, . . . , Ks10; data group G2 consists of Ks2, Ks3, . . . , Ks11; data group Gm consists of Ksm, Ks(m+1), Ks(m+2), . . . , Ks(m+9); and data group G(m+1) consists of Ks(m+1), Ks(m+2), . . . , Ks(m+10). Specifically, "data group G(m+1)" refers to a data group consisting of 10 porosities Ks prepared through the following procedure: the porosity Ksm of the virtual line Km (i.e., the first data of data group Gm) is eliminated from data group Gm, and the remaining nine porosities (Ks(m+1), . . . , Ks(m+9)) are added to the porosity Ks(m+10) of the virtual line K(m+10), which is next to the final virtual line K(m+9) of data group Gm. The virtual line K(m+10) corresponding to the porosity Ks(m+10) (i.e., the 10th data of data group G(m+1)) is defined as the boundary V1 between the active layer 420 and the current collecting layer 410 when "the average of the porosities Ks in G(m+1)" first exceeds "a value obtained by addition of the double of the standard deviation (σ) of the 10 porosities Ks in Gm to the average of the porosities Ks in Gm" or when "the average of the porosities Ks in G(m+1)" first falls below "a value obtained by subtraction of the double of the standard deviation (σ) of the 10 porosities Ks in Gm from the average of the porosities Ks in Gm." Specifically, the boundary V1 between the active layer 420 and the current collecting layer 410 is the virtual line K(m+10) corresponding to the 10th porosity Ks(m+10) in data group G(m+1) first satisfying the following formula (1):

$$|(G(m+1)\text{Ave})-(Gm\text{Ave})|>2\sigma m \qquad (1)$$

where "GmAve" represents the average of the porosities Ks in data group Gm, "G(m+1)Ave" represents the average of the porosities Ks in data group G(m+1), and "σm" represents the standard deviation of the porosities Ks in data group Gm. The determination of the boundary V1 can distinguish between the active layer 420 and the current collecting layer 410 in the analytical image M1.

The boundary V1 between the current collecting layer 410 and the active layer 420 of the cathode 114 may be determined by utilizing the feature that the GDC content (concentration) of the current collecting layer 410 is lower than that of the active layer 420.

(Method for Determining Boundary V2 Between Cathode 114 and Intermediate Layer 180)

In the analytical image M1, a region of the cathode 114 can be distinguished from a region of the intermediate layer 180 on the basis of, for example, the difference in size between grains or the presence or absence of a cathode material. Thus, the boundary between these regions can be determined as the boundary V2 between the cathode 114 and the intermediate layer 180. For example, the cathode 114 (i.e., a region containing LSCF serving as a cathode material) can be distinguished from the intermediate layer 180 (i.e., a region not containing LSCF). Thus, the boundary between these regions can be determined as the boundary V2 between the cathode 114 and the intermediate layer 180.

(Positional Relationship Between LSCF, GDC, and $SrSO_4$ Grains)

The positional relationship between LSCF, GDC, and $SrSO_4$ grains is determined through elemental analysis of lanthanum (La), cerium (Ce), strontium (Sr), and sulfur (S) by means of an energy dispersive X-ray analyzer (EDS). A synthetic image obtained by superimposing of the analytical images of these elements (see the enlarged view of FIG. 6) can be used to determine whether an $SrSO_4$ grain coves a GDC gain or an LSCF grain and determine the lengths of the aforementioned boundaries B1 and B2. For the determination as to whether an $SrSO_4$ grain coves a GDC gain or an LSCF grain, in the synthetic image, a portion where Sr overlaps with S is defined as an $SrSO_4$-present region, a portion containing La is defined as an LSCF-present region, and a portion containing Ce is defined as a GDC-present region. The determination as to whether an $SrSO_4$ grain coves a GDC gain or an LSCF grain can be made by determining whether the $SrSO_4$-present region is located near the LSCF-present region or the GDC-present region. For determination of the lengths of the boundaries B1 and B2, in the synthetic image, a portion where Sr overlaps with S is defined as an $SrSO_4$-present region, a portion containing La is defined as an LSCF-present region, and a portion containing Ce is defined as a GDC-present region. The boundary between the $SrSO_4$-present region and the LSCF-present region is defined as B1, and the boundary between the $SrSO_4$-present region and the GDC-present region is defined as B2. Thus, the lengths of the boundaries B1 and B2 can be measured.

(GDC Occupancy)

For determination of the GDC occupancy, the aforementioned binarized image obtained through image analysis of GDC can be used to calculate the ratio of the total area of GDC grains to the total area of a specific target region. The specific target region is preferably located within a central region (i.e., a region between straight lines L1 and L2 in FIG. 6) among three regions prepared through trisection (in the z-axis direction) of the active layer 420 (between the boundaries V1 and V2). In the present embodiment, the central region preferably includes a region where the GDC occupancy is 1.4% to 36%.

A-7. Effects of the Present Embodiment:

According to the present embodiment, an $SrSO_4$ grain covers a portion of the surface of a GDC grain in the active layer 420 of the cathode 114. Thus, as compared with the case where the SrSO$_4$ grain covers only an LSCF grain, the area of the surface of the LSCF grain covered with the SrSO$_4$ grain is reduced, and an increase in the activation polarization of the cathode 114 can be prevented, resulting in prevention of impairment of fuel cell performance. According to the present embodiment, diffusion of Sr from the cathode 114 to the electrolyte layer 112 is prevented. Thus, a load imposed on the intermediate layer 180, serving as a reaction preventing layer, can be reduced, and the thickness of the intermediate layer 180 in the Z-axis direction can be reduced. A reduction in the thickness of the intermediate layer 180 in the Z-axis direction can lead to a reduction in the resistance of the intermediate layer 180, resulting in a reduction in the resistance of the entire unit cell 110.

According to the present embodiment, the length of the boundary B1 between an SrSO$_4$ grain and an LSCF grain is shorter than the boundary B2 between the SrSO$_4$ grain and a GDC grain. Thus, as compared with the case where the length of the boundary B1 is longer than that of the boundary B2, the area of the surface of the LSCF grain covered with the SrSO$_4$ grain is reduced, and an increase in the activation polarization of the cathode 114 can be prevented.

According to the present embodiment, at least one cross section of the active layer 420 of the cathode 114 includes a region where the GDC occupancy is 1.4% to 36%. Thus, as compared with the case where the GDC occupancy is less than 1.4% in all the cross sections of the active layer 420 of the cathode 114, the SrSO$_4$ grain covers a larger region of the surface of the GDC grain; i.e., the SrSO$_4$ grain covers a smaller region of the surface of the LSCF grain. Therefore, an increase in the activation polarization of the cathode 114 can be more effectively prevented.

B. Modifications

The technique disclosed in the present specification is not limited to the above embodiment, but may be modified into various other forms without departing from the gist thereof. For example, the technique may be modified as described below.

In the above embodiment, the perovskite oxide contained in the active layer 420 of the cathode 114 LSCF. However, the perovskite oxide is not limited to LSCF, but may be any Sr-containing perovskite oxide, such as LSM. In the above embodiment, the second cerium oxide contained in the active layer 420 of the cathode 114 is GDC. However, the second cerium oxide is not limited to GDC, but may be, for example, SDC, LDC, or YDC. The second cerium oxide may be the same as or different from the first cerium oxide contained in the intermediate layer 180. The cathode 114 may have a single-layer structure including only the active layer.

In the above embodiment, an SrSO$_4$ grain is in contact with both a GDC grain and an LSCF grain in at least one cross section of the active layer 420 of the cathode 114. However, the present invention is not limited to such a case, and an SrSO$_4$ grain may be in contact with only a GDC grain. In the above embodiment, the boundary B1 between an SrSO$_4$ grain and an LSCF grain may be equal to or longer than the boundary B2 between the SrSO$_4$ grain and a GDC grain.

In the above embodiment, at least one cross section of the active layer 420 of the cathode 114 includes a region where the GDC occupancy is 1.4% to 36%. However, the present invention is not limited to such a case. For example, the active layer 420 of the cathode 114 may include a region where the ratio of the weight of GDC to the total weight of GDC and LSCF; i.e., the GDC ratio by weight (=the weight of GDC/(the weight of GDC+the weight of LSCF)) is 0.5 or more. Even in such a configuration, dispersion of SrSO$_4$ in GDC causes a reduction in the amount of SrSO$_4$ grains covering the surfaces of LSCF grains. Thus, an increase in the activation polarization of the cathode 114 can be more effectively prevented.

In the above embodiment, the active layer 420 of the cathode 114 is configured such that an SrSO$_4$ grain covers a portion of the surface of a GDC grain. However, the SrSO$_4$ grain may cover the entire surface of the GDC grain. The active layer 420 of the cathode 114 does not necessarily contain S.

In the above embodiment, the number of the electricity generation units 102 included in the fuel cell stack 100 is a mere example and is determined as appropriate in accordance with, for example, a required output voltage of the fuel cell stack 100. In the above embodiment, the number of the bolts 22 used for fastening of the fuel cell stack 100 is a mere example and is determined as appropriate in accordance with, for example, a required fastening force of the fuel cell stack 100.

In the above embodiment, the nut 24 is engaged with each of opposite ends of the bolt 22. However, the bolt 22 may have a head, and the nut 24 may be engaged with only an end of the bolt 22 opposite the head.

In the above embodiment, the end plates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiment, spaces between the outer circumferential surfaces of shaft portions of the bolts 22 and the inner circumferential surfaces of the communication holes 108 are utilized as manifolds. However, axial holes may be provided in the shaft portions of the bolts 22 for use as the manifolds. Also, the manifolds may be provided separately from the communication holes 108 into which the bolts 22 are inserted.

In the above embodiment, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiment, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiment, the anode-side current collector 144 may have a structure similar to that of the cathode-side current collector 134, and the anode-side current collector 144 and the adjacent interconnector 150 may be integrally formed as a unitary member. The anode-side frame 140 rather than the cathode-side frame 130 may be an insulator. Also, the cathode-side frame 130 or the anode-side frame 140 may have a multilayer structure.

In the above embodiment, materials used for formation of the members are provided merely by way of example. Other materials may be used to form the members.

In the above embodiment, the hydrogen-rich fuel gas FG is obtained by reforming city gas. However, the fuel gas FG may be obtained from another material, such as LP gas, kerosene, methanol, or gasoline. Alternatively, pure hydrogen may used as the fuel gas FG.

In the present specification, the "structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be said to be a structure in which the cathode 114 and the anode 116 face each other with the electrolyte layer 112 intervening therebetween.

In the above embodiment (or modifications; the same also applies in the following description), each of the electricity generation units 102 included in the fuel cell stack 100 is configured such that an $SrSO_4$ grain covers a portion of the surface of a GDC grain in the active layer 420 of the cathode 114. If at least one electricity generation unit 102 included in the fuel cell stack 100 has such a configuration, impairment of fuel cell performance can be prevented.

The above embodiment corresponds to an SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2016-81813, detailed description thereof is omitted, but schematically, the electrolysis cell stack has a structure similar to that of the fuel cell stack 100 in the above embodiment. That is, the fuel cell stack 100 in the above embodiment may be read as "electrolyis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. Consequently, the electrolysis of water occurs in the electrolysis cell units, whereby hydrogen gas is generated in the anode chambers 176, and hydrogen is discharged to the outside of the electrolysis cell stack through the communication hole 108. Even in the electrolysis cell unit and the electrolysis cell stack having the aforementioned structures, impairment of fuel cell performance can be prevented through employment of a configuration similar to that of the above embodiment; i.e., a configuration such that an $SrSO_4$ grain covers a portion of the surface of a GDC grain in the active layer 420 of the cathode 114.

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 104, 106: end plate; 108: communication hole; 110: unit cell; 112: electrolyte layer; 114: cathode; 116: anode; 120: separator; 121: hole; 130: cathode-side frame; 131: hole; 132: oxidizer gas supply communication hole; 133: oxidizer gas discharge communication hole; 134: cathode-side current collector; 135: current collector element; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 150: interconnector; 161: oxidizer gas introduction manifold; 162: oxidizer gas discharge manifold; 166: cathode chamber; 171: fuel gas introduction manifold; 172: fuel gas discharge manifold; 176: anode chamber; 180: intermediate layer; 270; 410: current collecting layer; 420: active layer; B1, B2: boundary; FG: fuel gas; FOG: fuel offgas; OG: oxidizer gas; and OOG: oxidizer offgas

The invention claimed is:

1. An electrochemical reaction unit cell comprising:
an electrolyte layer containing a solid oxide;
a cathode and an anode which face each other in a first direction with the electrolyte layer intervening therebetween; and
an intermediate layer disposed between the electrolyte layer and the cathode and containing a first cerium oxide, the electrochemical reaction unit cell being characterized in that:
the cathode includes an active layer containing a strontium-containing perovskite oxide, a second cerium oxide, and strontium sulfate and having ion conductivity and electron conductivity,
wherein a grain of the strontium sulfate contained in the cathode covers at least a portion of the surface of a grain of the second cerium oxide, and
wherein, in at least one cross section of the active layer of the cathode, the grain of the strontium sulfate covers the at least the portion of the surface of the grain of the second cerium oxide, and a boundary between the grain of the strontium sulfate and a grain of the perovskite oxide is shorter than a boundary between the grain of the strontium sulfate and the grain of the second cerium oxide.

2. An electrochemical reaction unit cell according to claim 1, wherein the cathode further contains sulfur.

3. An electrochemical reaction unit cell according to claim 1, wherein the at least one cross section of the active layer of the cathode includes a region having an occupancy of the second cerium oxide of 1.4% to 36%.

4. An electrochemical reaction unit cell according to claim 1, wherein the electrochemical reaction unit cell is a fuel cell unit cell.

5. An electrochemical reaction cell stack comprising a plurality of electrochemical reaction unit cells, the electrochemical reaction cell stack being characterized in that:
at least one of the electrochemical reaction unit cells is the electrochemical reaction unit cell as recited in claim 1.

* * * * *